(12) United States Patent
Ferris

(10) Patent No.: US 12,728,604 B2
(45) **Date of Patent: *Sep. 8, 2026**

(54) PACKAGES CONFIGURED FOR IMPROVED SEALING

(71) Applicant: Intercontinental Great Brands LLC, East Hanover, NJ (US)

(72) Inventor: Kevin Ferris, Birmingham (GB)

(73) Assignee: Intercontinental Great Brands LLC, East Hanover, NJ (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/692,131

(22) Filed: Mar. 10, 2022

(65) Prior Publication Data

US 2022/0194018 A1 Jun. 23, 2022

Related U.S. Application Data

(63) Continuation of application No. 16/674,992, filed on Nov. 5, 2019, now Pat. No. 11,298,887.

(51) Int. Cl.
*B29C 65/48* (2006.01)
*B29C 65/00* (2006.01)
(Continued)

(52) U.S. Cl.
CPC .......... *B29C 65/4815* (2013.01); *B29C 65/18* (2013.01); *B29C 65/76* (2013.01);
(Continued)

(58) Field of Classification Search
CPC ......... B29C 65/02; B29C 65/18; B29C 65/40; B29C 65/4815; B29C 65/72; B29C 65/76;
(Continued)

(56) References Cited

U.S. PATENT DOCUMENTS 3,392,458 A 7/1968 Braun
3,528,867 A 9/1970 Leatherman
(Continued)

FOREIGN PATENT DOCUMENTS

CN 202875228 4/2013
JP 54143391 11/1979
(Continued)

OTHER PUBLICATIONS

English translation of JP2004224343 obtained from espacenet. com.*

(Continued)

*Primary Examiner* — Yan Lan
(74) *Attorney, Agent, or Firm* — Fitch, Even, Tabin & Flannery LLP

(57) ABSTRACT

A package is provided that is formed from a packaging material, such as film, having increased adhesive in critical locations, such as adjacent folds in the end seal and other areas so that that the increased adhesive can at least partially fill voids adjacent such folds. The additional, localized sealant material is applied in a plurality of discrete locations in the end seal or other region adjacent where folds are formed and overlap with a sealant layer so as to provide additional sealant material for at least partially filling the voids without being present throughout the entirety, majority or large portions of the packaging material.

8 Claims, 7 Drawing Sheets

(51) Int. Cl.

| | |
|---|---|
| ***B29C 65/18*** | (2006.01) |
| ***B29C 65/76*** | (2006.01) |
| ***B65D 65/14*** | (2006.01) |
| *B29C 65/40* | (2006.01) |
| *B29C 65/72* | (2006.01) |
| *B32B 7/06* | (2019.01) |
| *B32B 7/14* | (2006.01) |
| *B32B 27/08* | (2006.01) |
| *B32B 37/12* | (2006.01) |

(52) U.S. Cl.

CPC ........ *B29C 66/1122* (2013.01); *B29C 66/431* (2013.01); *B29C 66/4322* (2013.01); *B65D 65/14* (2013.01); *B29C 65/40* (2013.01); *B29C 65/72* (2013.01); *B29C 66/133* (2013.01); *B29C 66/21* (2013.01); *B29C 66/723* (2013.01); *B32B 7/06* (2013.01); *B32B 7/14* (2013.01); *B32B 27/08* (2013.01); *B32B 2037/1215* (2013.01); *B32B 2307/31* (2013.01); *B32B 2439/70* (2013.01)

(58) Field of Classification Search

CPC ... B29C 66/1122; B29C 66/133; B29C 66/21; B29C 66/431; B29C 66/4322; B29C 66/1723; B29C 66/17341; B29C 66/173921; B29C 66/73186; B29C 66/723; B65D 31/10; B65D 33/02; B65D 65/02; B65D 65/14; B65D 75/008; B65D 75/12; B65D 75/26; B65D 75/52; B32B 7/05; B32B 7/06; B32B 7/14; B32B 2037/1215; B32B 2307/31; B32B 2439/70; B32B 27/08; Y02W 30/80

USPC ......... 156/60, 196, 199, 200, 203, 204, 212, 156/213, 217, 227, 250, 256, 269, 270, 156/295, 308.2, 308.4, 309.6; 229/5.84, 229/87.01, 87.08, 198.2; 426/106; 428/35.2, 35.4, 35.7, 36.6, 36.7, 195.1, 428/198, 200, 349

See application file for complete search history.

(56) References Cited

U.S. PATENT DOCUMENTS

| | | | | |
|---|---|---|---|---|
| 4,305,771 | A | 12/1981 | McLaren | |
| 4,597,103 | A | 6/1986 | Hoover | |
| 4,721,242 | A | 1/1988 | Reil | |
| 4,801,078 | A | 1/1989 | Carlsson | |
| 5,061,500 | A * | 10/1991 | Mendenhall | B65D 81/3469 426/118 |
| 5,134,001 | A | 7/1992 | Osgood | |
| 5,721,025 | A | 2/1998 | Falla | |
| 6,046,443 | A | 4/2000 | Ackerman | |
| 6,186,998 | B1 | 2/2001 | Inuzuka | |
| 7,015,442 | B2 | 3/2006 | Tucker, Jr. | |
| 8,398,306 | B2 | 3/2013 | Kinigakis | |
| 8,448,844 | B2 | 5/2013 | Yan | |
| 9,346,246 | B2 | 5/2016 | Bender | |
| 9,463,916 | B2 | 10/2016 | Cohn | |
| 2002/0094922 | A1 * | 7/2002 | Edwards | B65D 33/065 383/104 |
| 2005/0255200 | A1 * | 11/2005 | Takahagi | A23L 5/15 426/113 |
| 2006/0257056 | A1 | 11/2006 | Miyake | |
| 2009/0081451 | A1 | 3/2009 | Galoff | |
| 2018/0002095 | A1 | 1/2018 | Mcdonald | |
| 2018/0273266 | A1 * | 9/2018 | Hagimoto | B65D 75/30 |
| 2019/0184649 | A1 * | 6/2019 | Trejo | B65D 31/10 |

FOREIGN PATENT DOCUMENTS

| | | | | |
|---|---|---|---|---|
| JP | S56151672 | | 11/1981 | |
| JP | 2002104327 | | 4/2002 | |
| JP | 2004224343 | A * | 8/2004 | |
| JP | 2008254787 | | 10/2008 | |
| JP | 2014526990 | | 10/2014 | |
| JP | 2017165463 | | 9/2017 | |
| JP | 2019073312 | | 5/2019 | |
| WO | 2014017575 | | 1/2014 | |
| WO | 2017116797 | | 7/2017 | |
| WO | 2018038709 | | 3/2018 | |
| WO | WO-2018038709 | A1 * | 3/2018 | B29C 65/48 |

OTHER PUBLICATIONS

International Search Report and Written Opinion of the International Searching Authority, date of mailing Feb. 12, 2021, International Application No. PCT/US2020/057490 (8 pgs.).

English translation of Decision of Rejection, date of mail Jul. 13, 2023, Chinese Patent Application No. 202080070061.9 (3 pgs.).

English translation of Official Action No. 1, mailing date Feb. 21, 2023, Japanese Patent Application No. 2022-521312 ( 4 pgs.).

Examination Report No. 1, dated Jul. 6, 2023, Australian Patent Application No. 2020377876 (4 pgs.).

First Office Action, date of mail Feb. 16, 2023, Chinese Patent Application No. 202080070061.9, with English translation (13 pgs.).

Office Action, dated May 26, 2023, Canadian Patent Application No. 3,157,342 (3 pgs.).

EPO Examination Report dated Jun. 7, 2024, EP Patent Application No. 20808580.3 (4 pgs.).

* cited by examiner

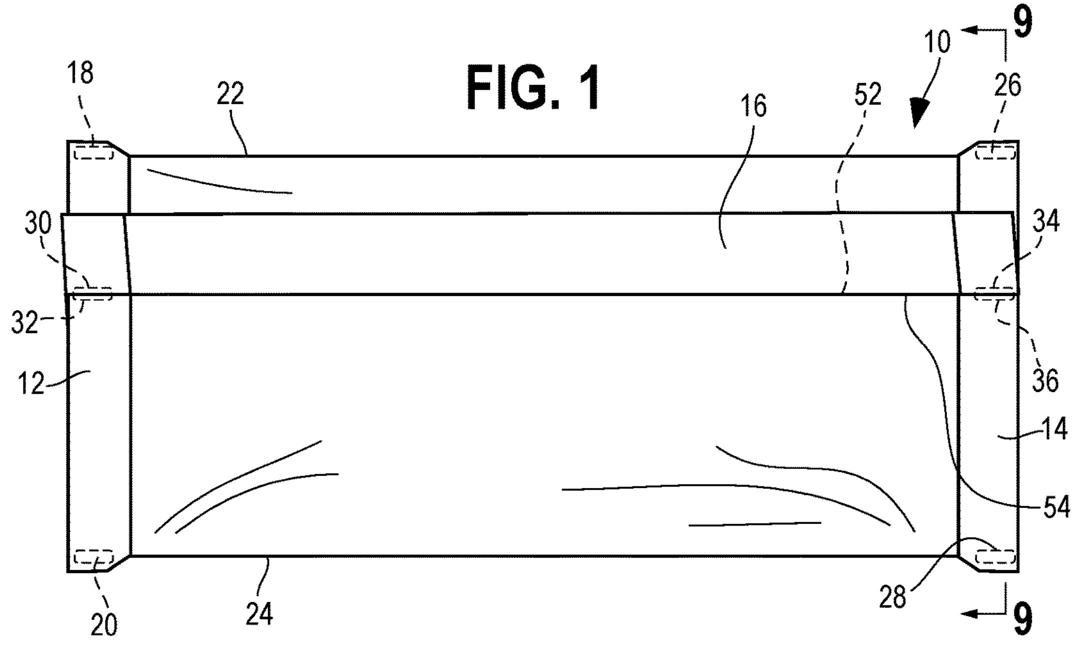
FIG. 1
10
9
9
18
22
16
52
26
30
34
32
12
36
14
54
20
24
28
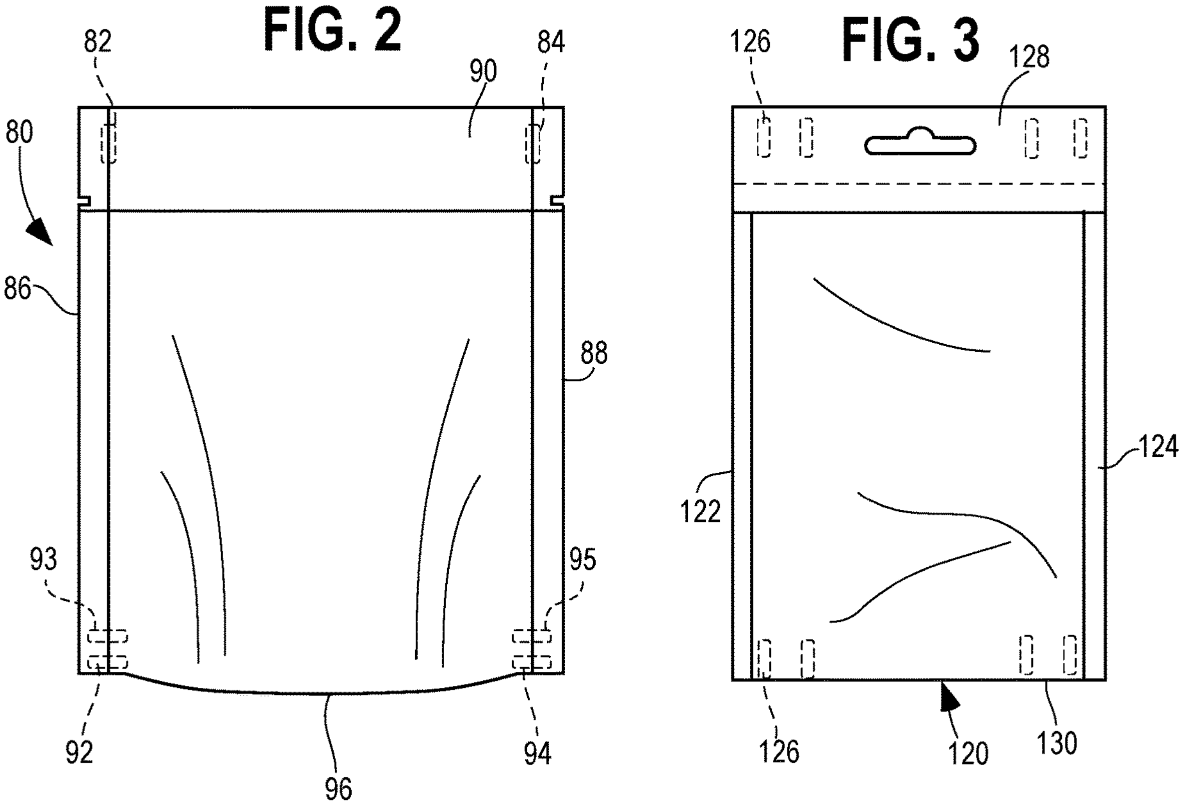
FIG. 2
82
84
90
80
86
88
93
95
92
94
96
FIG. 3
126
128
122
124
126
120
130

104
108
114
110
112
116
100
102
106

116
110
114
112

104
108

10
12
18
22
24
20
54
32
30
52
16

16
32
30
52
54

24
20

PACKAGES CONFIGURED FOR IMPROVED SEALING

CROSS-REFERENCE TO RELATED APPLICATIONS

This application is a continuation of U.S. patent application Ser. No. 16/674,992, filed Nov. 5, 2019, which is hereby incorporated herein by its reference in its entirety.

FIELD

Packages configured for improved sealing are described herein, and, in particular, packages with sealant material configured for forming improved seals during formation of the package.

BACKGROUND

Many different types of packages are made from films, papers and the like. One common packaging film has one or more base layers and a heat sealant layer. The film can be folded such that heat sealant layers abut. Heat and pressure can be applied to seal abutting heat sealant layers to seal the package, such as by forming end seals, gussets, fin seals and other seals. However, adjacent folds the material may not abut. Instead, the material adjacent the folds can be spaced with a void therebetween. The presence of such voids can undesirably impact the strength or integrity of the seal.

One solution to reduce or eliminate such voids is to use a thicker heat sealant layer. However, this disadvantageously can increase cost as well as impact the suitability of the package for recycling. That is because the industry is moving towards renewable and recyclable packaging materials. To claim recyclability certain percentages of the film must be of specific types of material. This means that a multiple layer film, where one of the layers is a relatively thick adhesive or sealant layer, may not be able to be used if the sealant layers unnecessarily cover portions of the film that are not sealed (typically the vast majority of the film).

SUMMARY

A package is provided that is formed from a material having increased adhesive incritical locations, such as adjacent folds in the end seal and other areas so that that the increased adhesive can at least partially fill voids adjacent such folds. The additional, localized sealant material is applied in a plurality of discrete locations in the end seal or other region adjacent where folds are formed overlap with a sealant layer in the material. Preferably, though not necessarily, the additional, localized sealant material (such as a heat sealant material, cold sealant material or other types of sealant) is applied during the packaging process after the material (film, paper, paperboard, or the like) is unwound.

A package can be formed from a packaging material, such as a film, paper or combinations thereof, having at least a base layer and a sealant layer, such as a heat sealant layer or cold sealant layer. The sealant layer may be, but does not have to be, coextensive with the base layer. Advantageously, the material has localized sealant material disposed on the sealant layer and in a plurality of discrete locations. The package having one or more end seal regions having folds with the discrete locations of the localized sealant material being adjacent to the folds such that the localized sealant material at least partially fills voids adjacent the folds, particularly where the sealant layer does not abut.

In one aspect, the package includes a first end seal region having folds at lateral edges thereof. The discrete locations of the localized sealant material can include a first pair of discrete locations adjacent the folds of the first end seal region.

In another aspect, the package includes a first end seal region and a second end seal region. Each of the first and second end seal regions can have folds at lateral edges thereof. The discrete locations of the localized sealant material includes a first pair of discrete locations adjacent the folds of the first end seal region and a second pair of discrete locations adjacent the folds of the second end seal region. The package can optionally include a fin seal extending between the first and second end seal regions and having a first portion disposed in the first end seal region with a first pair of fin seal folds and a second portion disposed in the second end seal region with a second pair of fin seal folds. The discrete locations of the localized sealant material can include a third pair of discrete locations adjacent the first pair of fin seal folds and a fourth pair of discrete locations adjacent the second pair of fin seal folds.

In yet another aspect, the package is a flow wrap package with at least one food item disposed therein, although other items instead of food can be contained within the package.

Alternatively, the package can be a stand-up package, with a gusseted bottom end opposite a top end having the first end seal region. The gusseted bottom end includes a gusset end seal region with a plurality of gusset folds. A plurality of discrete locations of the localized sealant material can be adjacent the gusset folds of the gusset end seal region.

In another alternative, the package is a quad-style package, with a pair of gusseted sides. The gusseted sides can each include a pair of side seals and side seal folds. A plurality of discrete locations of the localized sealant material can be positioned adjacent the side seal folds.

In any of the examples discussed herein, the localized sealant material can have a lower melt point as compared to melt point of the sealant layer.

In any of the examples discussed herein, the localized sealant material can flow under pressure, and may or may not be heat-activated.

For the packages described herein having at least one end seal region, the package can be made by unwinding the packaging material from a reel of material; applying the localized sealant material in the plurality of discrete locations; forming the end seal region having the folds; and applying pressure and or heat to the end seal region to cause portions of the sealant layer to adhere and to cause the localized sealant material to fill voids adjacent the folds.

In an exemplary method of making the flow-wrap package described herein, the method can include unwinding the packaging material from a reel of material; applying the localized sealant material in the plurality of discrete locations; forming the fin seal; applying pressure and or heat to the fin seal to cause portions of the sealant layer to adhere and to cause the localized sealant material to fill voids adjacent the folds; forming the end seal regions having the folds; and applying pressure and or heat to the end seal regions to cause portions of the sealant layer to adhere and to cause the localized sealant material to fill voids adjacent the folds.

In the method of making the packages described herein, the localized sealant material is applied after unwinding the packaging material from the real of material.

BRIEF DESCRIPTION OF THE DRAWINGS

FIG. 1 is a plan view of the rear side of a flow-wrap package containing a chocolate bar, showing a pair of end seals and a fin seal extending between the end seals;

FIG. 2 is a front elevation view of a stand-up, Doy-style package containing a food product;

FIG. 3 is a front elevation view of a quad-style package, having a pair of opposing side gussets;

It will be understood that various features of the figures are enlarged, exaggerated and/or not to scale in order to illustrate the structures discussed herein.

DETAILED DESCRIPTION

Packages formed from materials such as flexible film or paper products are advantageously configured for improved sealing by the addition of localized sealant material in a plurality of discrete locations. The discrete locations where the localized sealant material is added can be in seal areas adjacent folds, such as in end seal regions adjacent lateral edge folds, folds adjacent fin seals in the end seal regions, or folds adjacent other sealing structures such as gussets in sides or bottoms of packages. The advantages of the additional of localized sealant material in a plurality of discrete locations can be incorporated into many different types of packages, which can optionally contain food, some of which are described herein by way of non-limiting exemplary embodiments.

An example of a flow-wrap type package 10, as shown in FIG. 1, can include a pair of end seal regions 12 and 14 and a fin seal 16 extended therebetween, including in the end seal regions 12 and 14 themselves. The packaging material typically has a base layer and a heat sealant layer. Of course, the base layer can be made of one or more layers, as can the heat sealant layer. As is common, the heat sealant layer is coextensive with the base layer, although it could be pattern applied. If a cold seal layer is used instead, it can be pattern applied or coextensive. While the package could be made from a film, it will be understood that paper could also be used, as well as other materials or combinations thereof. Similarly, the sealant layer can be a heat sealant layer, cold sealant layer or other type of sealant layer.

To produce a common type of a flow-wrap package, an item to be packaged, such as one or more food items, are deposited on a portion of a web of material, such as film, paper or combinations thereof, that is unwound from a reel of such material. The material is progressively folded about the item and a pair of opposing longitudinal edges of the material are brought together in abutment with the heat sealant layer of one edge abutting the heat sealant layer of the other edge. Heat and pressure are applied to form a fin seal using the heat sealant layer. Ends of the package can also be formed by applying heat and pressure to form end seal regions using the heat sealant layer.

Figures 4, 5, 6:
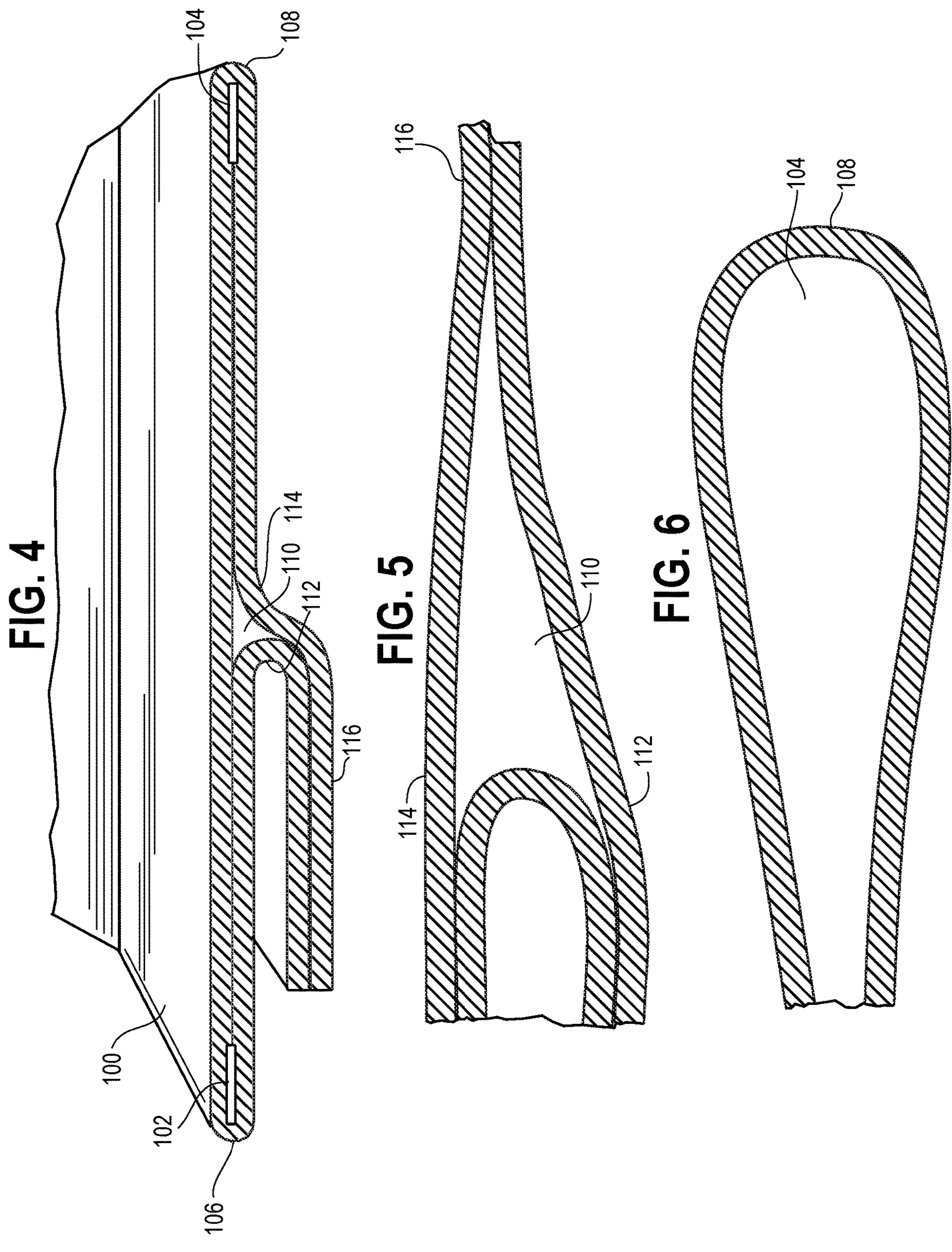
FIG. 4 is a schematic section view taken along of one of the end seals of a package similar to that of FIG. 1 but without localized sealant material, showing sealing gaps adjacent lateral folded edges and adjacent an intersection of the fin seal with the end seal.
FIG. 5 is an enlarged view of the prior art sealing gap adjacent the intersection of the fin seal and the one of the end seals of FIG. 4, with the fin being shown generally perpendicular relative to the end seal as compared to generally parallel in FIG. 4.
FIG. 6 is an enlarged view of the prior art sealing gap adjacent one of the lateral folded edges of FIG. 4.

In certain circumstances, the seals in the end seal regions may not be of sufficient strength or integrity due to voids that can arise between facing portions of the material. In particular, such voids have been found adjacent folds in the material. Due to the thickness and properties of the material, including its base and heat sealant layers, a perfect abutment of the opposing material layers adjacent folds in the packaging material may be difficult to achieve. As shown in the schematic cross section of FIG. 4 of an end seal region 100 of a common flow wrap package, voids 102 and 104 can be present adjacent folded lateral edges 106 and 108 of the end seal region 100, as shown in FIGS. 4 and 6, and a void 110 can be present adjacent folds 112 and 114 on each side of the fin seal region 116, as shown in FIGS. 4 and 5. While such voids 102, 104 and 110, may not be in every end seal region 100 for a given package, they are more likely to form in any one or in combinations of these areas. Disadvantageously, such voids 102, 104 and 110 can decrease the integrity of the end seal region 100.

The improved flow-wrap type package 10 is advantageously configured to reduce or eliminate voids adjacent folds in the material, particularly the end seal regions 12 and 14. More specifically, the package includes localized sealant material added to a plurality of discrete locations, as shown in FIG. 1, This localized sealant material is disposed on the sealant layer, but is present in discrete locations. A pair of deposits 18 and 20 of localized heat sealant material are in one of the end seal regions 12 at locations adjacent lateral edge folds 22 and 24 of the package 10. Similarly, a pair of deposits 26 and 28 of localized heat sealant material are in the other of the end seal regions 14 at locations adjacent the lateral edge folds 22 and 24 of the package 10. The localized heat sealant material is present in one or more deposits 30 and/or 32 adjacent the fin seal region 16 in the one of the end seal regions 12, as well as being present in one or more deposits 34 and/or 36 adjacent the fin seal region 16 in the other of the end seal regions 14.

The discrete locations are preferably spaced from each other, although groups of discrete locations could be joined, e.g., the localized heat sealant material could be present in strips or other larger groupings. When the end seals are formed, in addition to the abutting heat sealing layers adhering together to form seals, the localized sealant material is heated sufficiently so as to partially or, preferably, fill voids that may exist adjacent folds where the heat sealant material does not abut or does not abut sufficiently so as to form seals with an absence of voids. Integrity of the seals can thereby improve by filling, which can include either partial or full filling, of the voids, as compared to if there were no such localized sealant material.

Figures 9, 10, 11:
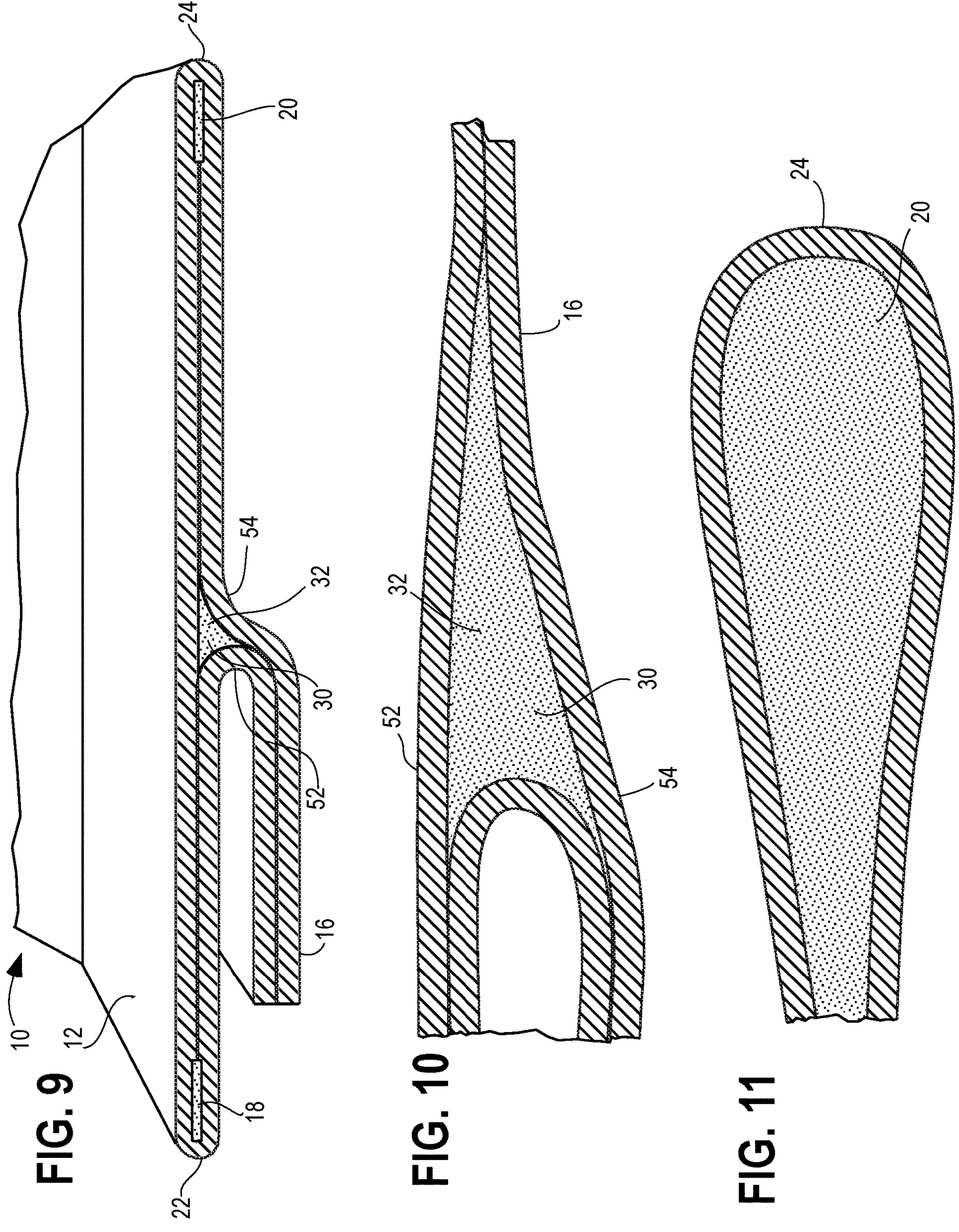
FIG. 9 is a schematic section view similar to that of FIG. 4, but from a package incorporating the localized sealant material to fill the prior art sealant gaps, taken along line 9-9 of FIG. 1.
FIG. 10 is an enlarged section view of the filled sealing gap adjacent the intersection of the fin seal and the one of the end seals of FIG. 9, with the fin shown generally perpendicular relative to the end seal as compared to being folded generally parallel as in FIG. 9.
FIG. 11 is an enlarged view of the fin sealing gap adjacent one of the lateral folded edges of FIG. 9.

As shown in FIG. 9-11, representing portions of the package of FIG. 1, the presence of the localized sealant material 18, 20, 30 and 32 can fill voids that may exist in the end seal region 12 of the package 10. More specifically, as shown in the schematic cross section of FIG. 9, the end seal region 12 of the flow wrap package 10 has a plurality of discrete locations with localized sealant material 18, 20, 30 and 32. Similarly, the end seal region 14 of the flow wrap package 10 has a plurality of discrete locations with localized heat sealant material 26, 28, 34 and 36. As shown in FIG. 9, voids adjacent the folded lateral edges 22 and 24 of the end seal region 12 are filled with the localized sealant material 18 and 20. Voids adjacent the folded lateral edges 22 and 24 of the other end seal region 14 are also filled with the localized sealant material 26 and 28. In addition, in the end seal region 12 adjacent folds 52 and 54 on each side of the fin seal region 16 are filed with the localized sealant material 30 and 32, as shown in FIG. 11. In the other end seal region 14, adjacent folds on each side of the fin seal region 16 are filed with the localized sealant material 34 and 36. Advantageously, such localized sealant material 18, 20, 30 and 32 and 26, 28, 34 and 36 can increase the integrity of the seals in the end seal regions 12 and 14 and result in more consistent seals at the end seal regions 12 and 14.

Figures 7, 8:
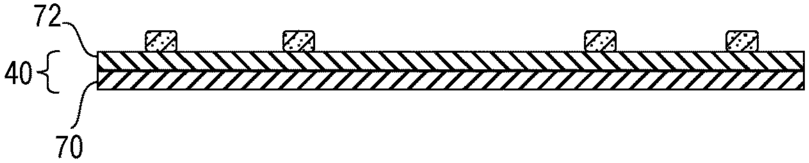
FIG. 7 is a schematic view of packaging material, which can be used to form an improved package similar to that of FIG. 1, being unwound from a reel and showing where the end seals and fin seals will be once the package is formed, as well as showing the addition of localized sealant material.
FIG. 8 is a section view of the packaging material of FIG. 7, taken along line 8-8 and exaggerated in size to show the localized sealant material relative to a heat sealant layer and a base layer.

To make the flow-wrap package 10 of FIG. 1 which includes the localized sealant material in a plurality of discrete locations, a web of film 40 or other packaging material can be unwound from a reel of material 42, as shown in FIG. 7. A food product (or other item or a plurality of items) is deposited upon a segment 44 of the web of packaging material 40 that will be used to form the package 10. More specifically, the food product is deposited on a central portion 46 of the segment 44 of the web of packaging material 40. A fin is then formed by folding opposing longitudinal edges 48 and 50 of the web of packaging material 40 toward each other about fin region folds 52 and 54 and sealed, thereby resulting in the lateral folds 22 and 24 about the central portion 46, and then end seals are sequentially formed in leading and trailing portions 56 and 58 and sealed packages 10 singulated from the remainder of the web of packaging material 40, as is conventional. The fold and other lines are shown in FIG. 7 for illustration purposes only. When the package 10 is formed, opposite the central portion 46 are a pair of panels 60 and 62 that are joined by fin portions 64 and 66.

The seals are predominately made between opposing portions of a heat sealant layer. Uniquely, however, is the addition of localized sealant material in a plurality of discrete locations that are more prone to having voids. More specifically, those discrete locations that are more prone to having voids are in the end seal regions 12 and 14 and adjacent folds 22, 24, 52 and 54 of the material. Preferably, though not necessarily, the localized sealant material is applied in line during unwinding of the web of packaging material 40 from the reel of packaging material 42. As shown in the section view of FIG. 8, the web of packaging material 40 includes a base layer 70 (which may include one or more layers of material) and a coextensive heat sealant layer 72. The localized sealant material is disposed on an opposite side of the heat sealant layer 72 as compared to the base layer 70.

For the flow-wrap package of FIG. 1, and with reference to the leading portion 56, the packaging material of FIG. 7 includes the localized sealant material deposits 18 and 20 in a first pair of discrete locations where the lateral folds 22 and 24 are formed as well as deposits 30 and 32 in a second pair of discrete locations where the fin seal region folds 52 and 54 are formed. Similarly, with reference to the trailing portion 58, the segment 44 of the web of packaging material 40 of FIG. 7 includes localized sealant material deposits 26 and 28 in a third pair of discrete locations where the lateral folds 22 and 24 are formed as well as deposits 34 and 36 in a fourth pair of discrete locations where the fin seal region folds 52 and 54 are formed.

The localized sealant material can be disposed on the heat sealant layer either prior to package formation or only after the seals are formed. The latter case, the localized sealant material can be disposed on a portion of the packaging material that is brought into contact with the sealant layer. For example, a cold or other sealant material can be one portion of the material that will be the end seal and the localized sealant material can in one or more discrete locations on an opposing portion of the material that will form the same end seal such that, when the end seal is formed, the localized sealant material is disposed on the other sealant material.

In one example, the localized sealant material can be polyethelyne, although other materials can be used depending upon the application. Other examples of localized sealant material can include EVA, Ionomer (e.g., Surlyn), metallocene LLDPE, metallocene vLDPE, LDPE, VLDPE, LLDPE, acid copolymer (e.g., Nucrel), terpolymer, amorphous copolymer, PB-1, TPE, starch-based, PBS or combinations of these materials. Preferably, though not necessarily, the localized heat sealant material can have an increased caulkability as compared to the underlying heat sealant material so that the localized sealant material can readily flow to fill any voids. In some instances, the flow can be due to compression and/or heat.

The benefits of localized sealant material can be utilized in a variety of different package formats, and is not limited to the flow-wrapped package of FIGS. 1 and 7-11. By way of non-limiting example, the localized sealant material can be incorporated into stand-up packages, quad-style packages and flat-bottomed bags, as discussed further below. As with the prior example of a flow-wrapped package, it is believed that the additional of localized sealant material is particularly advantageous adjacent folds in the packaging material material.

Figure 12:
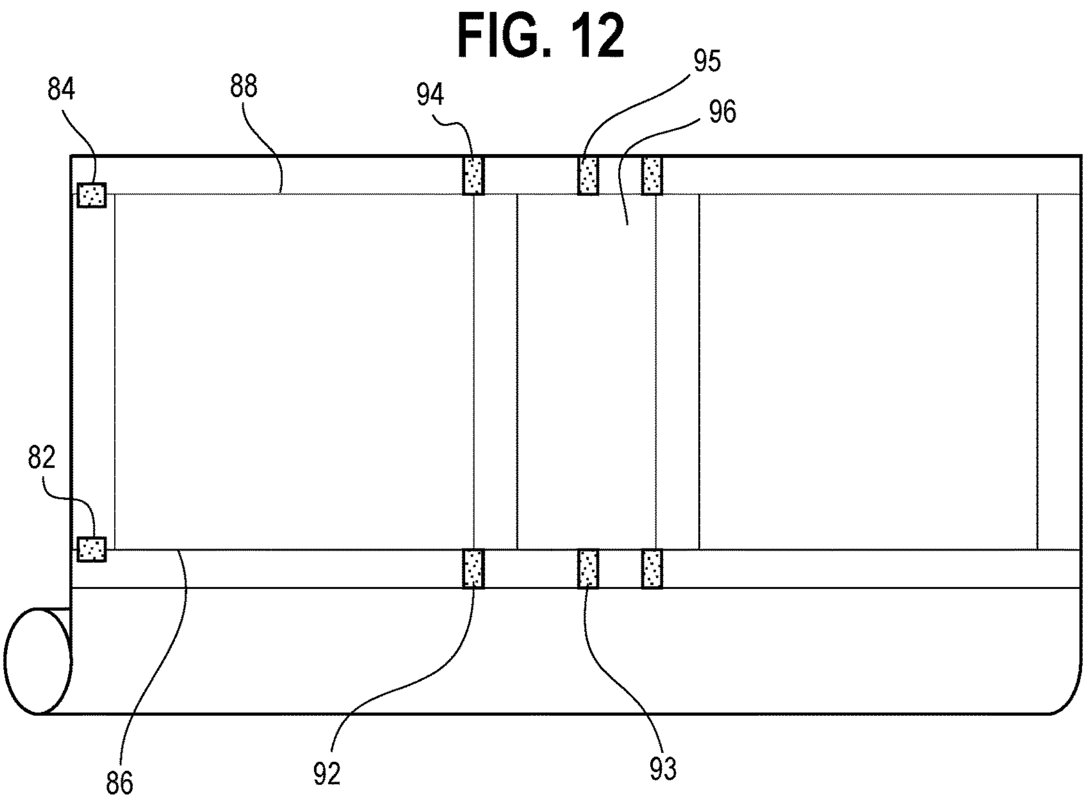
FIG. 12 is a schematic view of packaging material, which can be used to form an improved package similar to that of FIG. 2, being unwound from a reel and showing where the seals will be once the package is formed, as well as showing the addition of localized sealant material.

A stand-up package 80, such as that shown in FIG. 2, can include localized sealant material 82 and 84 in discrete locations adjacent lateral folds 86 and 88 in an end seal region 90 at the top of the package, as well as localized sealant material in discrete locations 92, 93, 94 and 95 adjacent a bottom panel 96. The package of FIG. 2 can be made using packaging material unwound from a reel of material, as shown in FIG. 12. The fold and other lines are shown in FIG. 12 for illustration purposes only.

Figure 13:
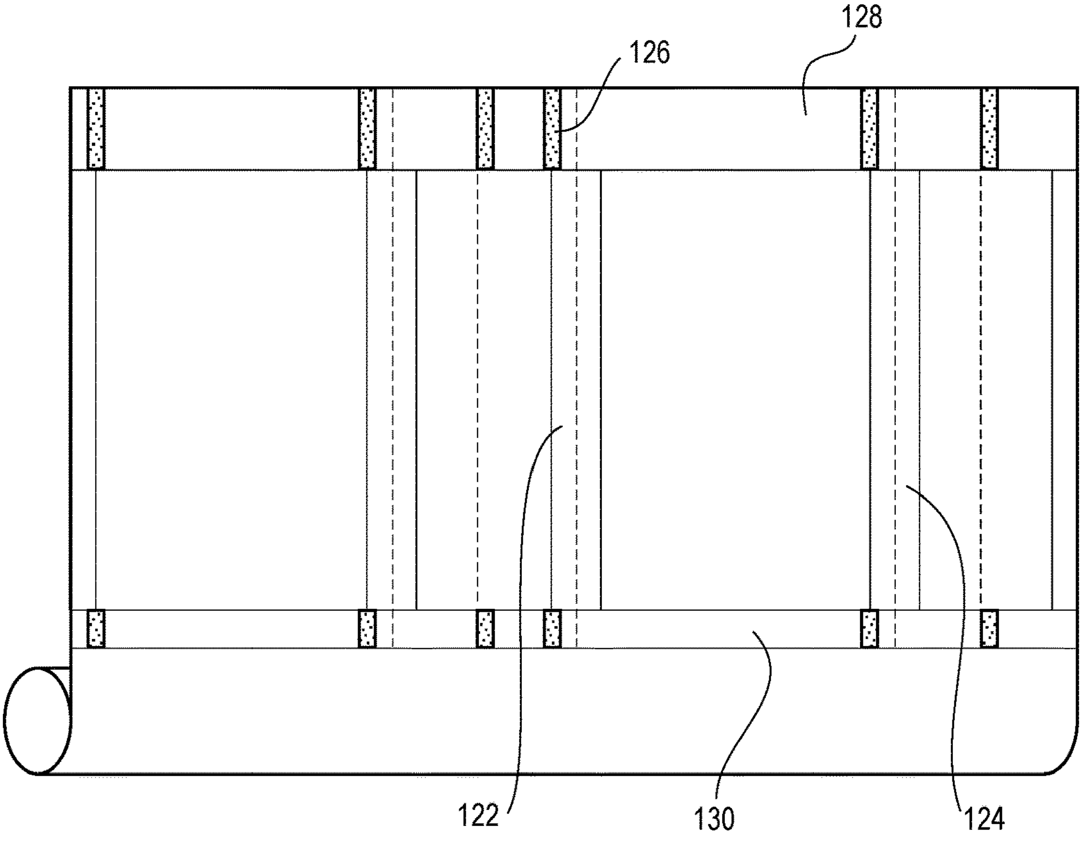
FIG. 13 is a schematic view of packaging material, which can be used to form an improved package similar to that of FIG. 3, being unwound from a reel and showing where the seals will be once the package is formed, as well as showing the addition of localized sealant material.

A quad-style package 120, shown in FIG. 3, can have a pair of side gussets 122 and 124. Localized sealant material can be applied in discrete locations 126 in an end seal region 128 at the top of the package as well as an end seal region 130 at the bottom of the package. The package of FIG. 3 can be made using packaging material unwound from a reel of material, as shown in FIG. 13. The fold and other lines are shown in FIG. 13 for illustration purposes only.

Figure 14:
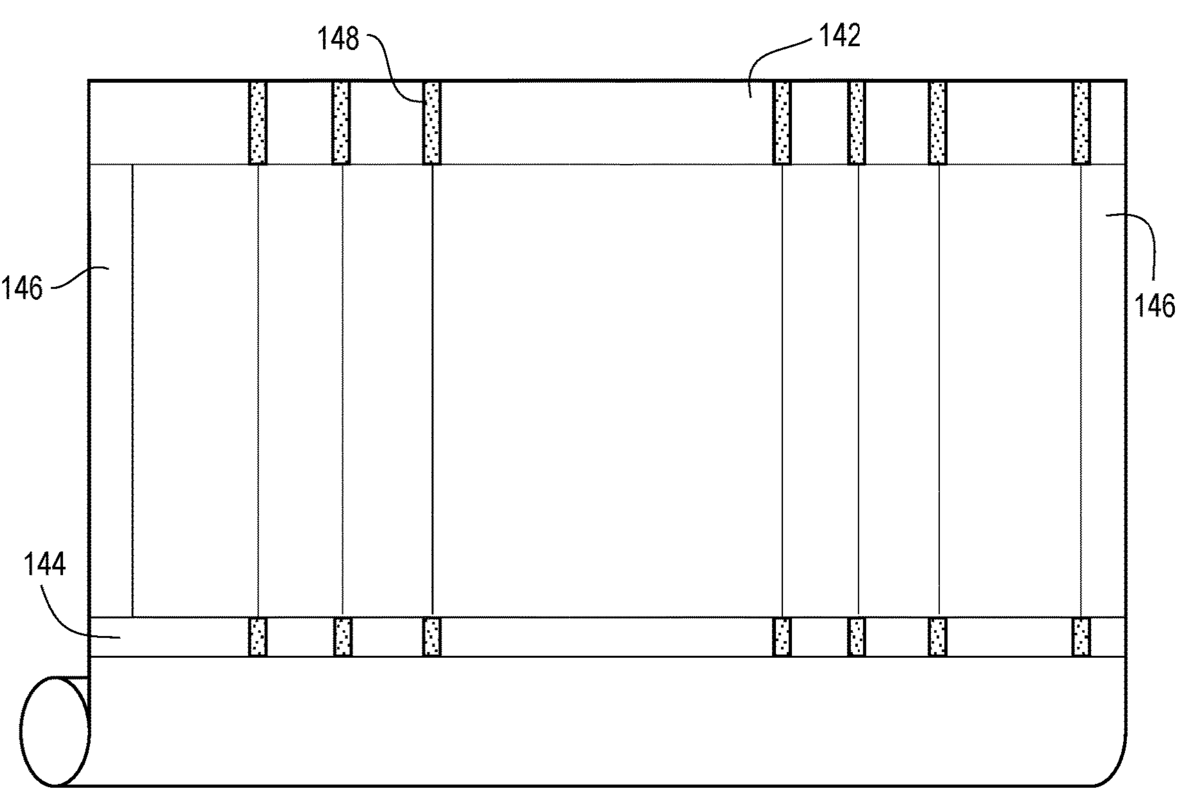
FIG. 14 is a schematic view of packaging material, which can be used to form an improved package similar to that of FIG. 15, being unwound from a reel and showing where the seals will be once the package is formed, as well as showing the addition of localized sealant material.
Figure 15:
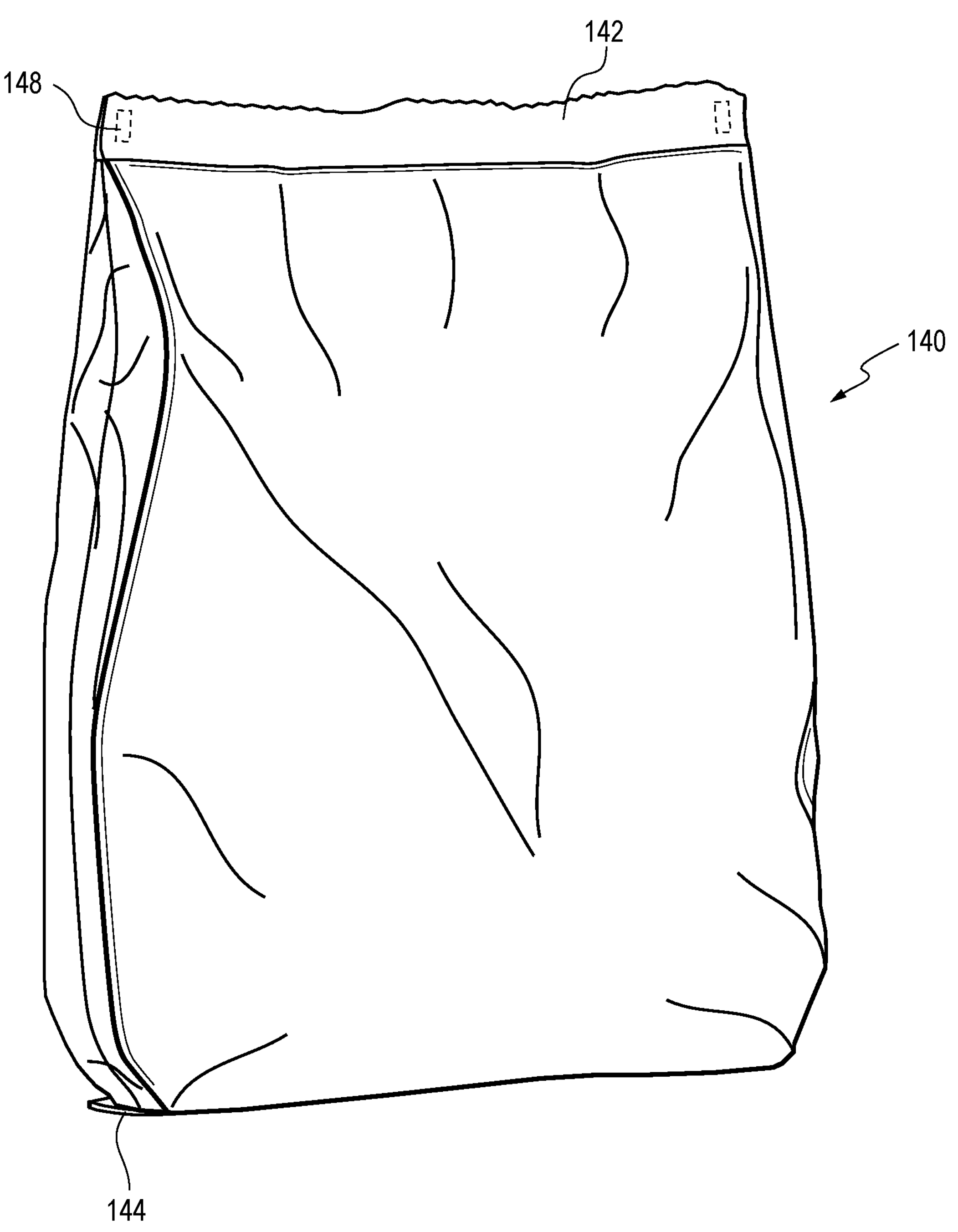
FIG. 15 is a front elevation view of a package with a flat bottom, having a top seal region and a bottom, folded over seal region, as well as side gussets.

A flat-bottom package 140, such as shown in FIG. 15, can include a top seal 142, a bottom seal 144 (shown folded over in FIG. 15) and a rear fin seal 146 (the components of which are shown in FIG. 14). The side panels can be gusseted. Localized sealant material 148 can be applied in discrete locations adjacent folds in the top seal 142, bottom seal 144 and rear fin seal 146, as shown in the web of material of FIG. 14 that can be formed into the package of FIG. 15. As with other examples of packaging material webs shown herein, the fold and other lines are shown in FIG. 14 for illustration purposes only.

The invention claimed is:

1. A package formed from a packaging material having at least a base layer and a sealant layer, the material having discrete and spaced apart deposits of adhesive disposed on the sealant layer in a plurality of discrete locations, wherein the sealant layer is a heat sealant layer or a cold sealant layer and made of a first material and the deposits of adhesive are made of a second material having both a lower melting point and a higher caulkability than the first material and comprising at least one of polyethylene, EVA, ionomer metallocene LLDPE, metallocene vLDPE, LDPE, VLDPE, LLDPE, acid copolymer, terpolymer, amorphous copolymer, PB-1, TPE, starch-containing polymer, and PBS, the package having one or more end seal regions having folds, with the discrete and spaced apart deposits of the adhesive being positioned adjacent to the folds such that the discrete and spaced apart deposits of the adhesive at least partially fill voids adjacent the folds.

2. The package of claim 1, wherein the package includes a first end seal region having folds at lateral edges thereof, the discrete and spaced apart deposits of the adhesive including a first pair of discrete locations adjacent the folds of the first end seal region.

3. The package of claim 2, wherein the package is a stand-up package, with a gusseted bottom end opposite a top end having the first end seal region.

4. The package of claim 3, wherein the gusseted bottom end comprises a gusset end seal region with a plurality of gusset folds, and a plurality of discrete and spaced apart deposits of the adhesive adjacent the gusset folds of the gusset end seal region.

5. The package of claim 1, wherein the package comprises a first end seal region and a second end seal region, each of the first and second end seal regions having folds at lateral edges thereof, the discrete and spaced apart deposits of the adhesive including a first pair of discrete deposits of the adhesive adjacent the folds of the first end seal region and a second pair of discrete deposits of the adhesive adjacent the folds of the second end seal region.

6. The package of claim 5, wherein the package comprises a fin seal extending between the first and second end seal regions and having a first portion disposed in the first end seal region with a first pair of fin seal folds and a second portion disposed in the second end seal region with a second pair of fin seal folds, the discrete and spaced apart deposits of the adhesive including a third pair of discrete and spaced apart deposits of the adhesive adjacent the first pair of fin seal folds and a fourth pair of discrete and spaced deposits of the adhesive adjacent the second pair of fin seal folds.

7. The package of claim 1, wherein the base layer comprises a plurality of different layers.

8. The package of claim 1, wherein the packaging material is a film.

* * * * *